United States Patent
Berry (10) Patent No.: US 9,452,918 B2
(45) Date of Patent: Sep. 27, 2016

(54) TRACK ROLLER ASSEMBLY FOR SUPPORTING TELESCOPING BOOM SECTIONS

(71) Applicant: Altec Industries, Inc., Birmingham, AL (US)

(72) Inventor: Robert A. Berry, Fincastle, VA (US)

(73) Assignee: Altec Industries, Inc., Birmingham, AL (US)

( * ) Notice: Subject to any disclaimer, the term of this patent is extended or adjusted under 35 U.S.C. 154(b) by 65 days.

(21) Appl. No.: 14/467,854

(22) Filed: Aug. 25, 2014

(65) Prior Publication Data

US 2016/0052761 A1    Feb. 25, 2016

(51) Int. Cl.
| | |
|---|---|
| *F16C 29/04* | (2006.01) |
| *B66F 11/04* | (2006.01) |
| *F16C 29/00* | (2006.01) |
| *B66C 23/70* | (2006.01) |

(52) U.S. Cl.
CPC .......... *B66F 11/046* (2013.01); *B66C 23/707* (2013.01); *F16C 29/005* (2013.01); *F16C 29/04* (2013.01)

(58) Field of Classification Search
CPC . B66C 23/701; B66C 23/707; B66C 23/708; B66F 11/04; B66F 11/044; B66F 11/046
See application file for complete search history.

(56) References Cited

U.S. PATENT DOCUMENTS

| | | | | | |
|---|---|---|---|---|---|
| 3,285,431 | A | * | 11/1966 | Butcher, Jr. .......... | B66C 23/707 212/350 |
| 3,480,109 | A | * | 11/1969 | Eitel ..................... | B66F 11/046 182/148 |
| 4,388,774 | A | * | 6/1983 | Thoemke ............... | A01K 91/08 114/255 |
| RE31,400 | E | * | 10/1983 | Rallis .................... | B66F 11/046 182/2.11 |
| 4,506,480 | A | * | 3/1985 | Murrill ................. | B66F 11/046 182/2.11 |
| 4,585,132 | A | * | 4/1986 | Rathe .................... | B66C 23/823 212/264 |
| 4,789,120 | A | * | 12/1988 | Spidel .................. | B66F 11/046 182/141 |
| 5,850,892 | A | * | 12/1998 | Citron ..................... | E04G 1/22 182/141 |
| 2011/0061313 | A1 | * | 3/2011 | Vos ......................... | B66F 9/205 52/118 |

* cited by examiner

*Primary Examiner* — Alvin Chin-Shue
*Assistant Examiner* — Candace L Bradford
(74) *Attorney, Agent, or Firm* — Erise IP, P.A.

(57) ABSTRACT

A track roller assembly for supporting telescoping boom sections of aerial devices. The track roller assembly is positioned in an interior channel of a hollow first boom section. The track roller assembly supports a majority of the weight of a second boom section and facilitates the second boom section telescoping in and out of the first boom section. The track roller assembly comprises a bracket to securely couple the track roller assembly to the interior channel of the first boom section, a plurality of rollers rotatably connected to the bracket, and a continuous track engaging the plurality of rollers on an interior surface and adjacent to the second boom section on an exterior surface.

11 Claims, 7 Drawing Sheets

TRACK ROLLER ASSEMBLY FOR SUPPORTING TELESCOPING BOOM SECTIONS

BACKGROUND

1. Field

Embodiments of the invention relate to boom assemblies. More specifically, embodiments of the invention relate to a track roller assembly for supporting a boom section and facilitating the telescoping of the boom section. In further embodiments of the invention, the boom section is formed of fiberglass.

2. Related Art

Utility workers utilize an aerial device to reach inaccessible locations. The aerial device is usually mounted on a utility truck and generally includes a boom assembly with a utility platform connected at a boom tip. The utility platform includes a bucket, sometimes referred to as a platform, in which one or more utility workers stand. Alternatively, or in addition, the boom assembly may have a winch or other tool at the boom tip.

Electric utility workers typically use an aerial device to access overhead electric power lines and electric power components for installation, repair, or maintenance. Utility workers in these situations will often utilize an aerial device that is electrically insulated and/or electrically isolated to prevent the discharge of electricity through the utility truck, and especially through the utility worker. Many aerial devices utilize at least one boom section that is formed of fiberglass or other electrically non-conductive material. The use of such material in the boom section insulates and isolates a utility worker or other tool or implement. While fiberglass has excellent insulating properties, it is susceptible to contact stresses and abrasion. Some fiberglass boom sections therefore utilize a roller mounted within the outer boom section to minimize damage to the fiberglass boom section. However, if the roller is too hard it can cause just as much damage, and if the roller is too soft its useful life is limited.

SUMMARY

Embodiments of the invention solve the above-mentioned problems by providing a track roller assembly for supporting and facilitating the telescoping of the fiberglass boom section. The track roller assembly comprises a plurality of rollers and a continuous track disposed around the rollers. The track roller assembly is located at least partially within a hollow first boom section. The rollers are rotatably coupled to either a bracket or the interior of the first boom section. The fiberglass boom section contacts the continuous track, such that the continuous track provides a larger surface area than a single roller.

A telescoping boom assembly for an aerial device in accordance with a first embodiment comprises a first boom section, a second boom section, and a track roller assembly. The second boom section is at least partially disposed within the first boom section. The track roller assembly is coupled to an interior channel of the first boom section, such that the second boom section is in contact with the track roller assembly. The track roller assembly provides support and facilitates the telescoping of the second boom section in and out of the first boom section.

A track roller assembly in accordance with a second embodiment comprises a bracket, a plurality of rollers, and a continuous track disposed around the plurality of rollers. The bracket is deformable into a first interfacing shape and a second interfacing shape. The plurality of rollers comprises a first roller, a second roller, and at least one secondary roller. The first roller is rotatably coupled at one end of the bracket, and a second roller is rotatably coupled at a second end of the bracket. The at least one secondary roller is disposed between the first roller and the second roller and rotatably coupled to the bracket. Upon the placement of a heavy load onto the boom assembly, the bracket will deform such that the at least one secondary roller contacts the interior surface of the continuous track. This will provide additional support and further distribute the load.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the current invention will be apparent from the following detailed description of the embodiments and the accompanying drawing figures.

BRIEF DESCRIPTION OF THE DRAWING FIGURES

Embodiments of the current invention are described in detail below with reference to the attached drawing figures, wherein.

The drawing figures do not limit the current invention to the specific embodiments disclosed and described herein. The drawings are not necessarily to scale, emphasis instead being placed upon clearly illustrating the principles of the invention.

DETAILED DESCRIPTION

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the current invention. The following detailed description is, therefore, not to be taken in a limiting sense. The scope of embodiments of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the current technology can include a variety of combinations and/or integrations of the embodiments described herein.

Figure 1:
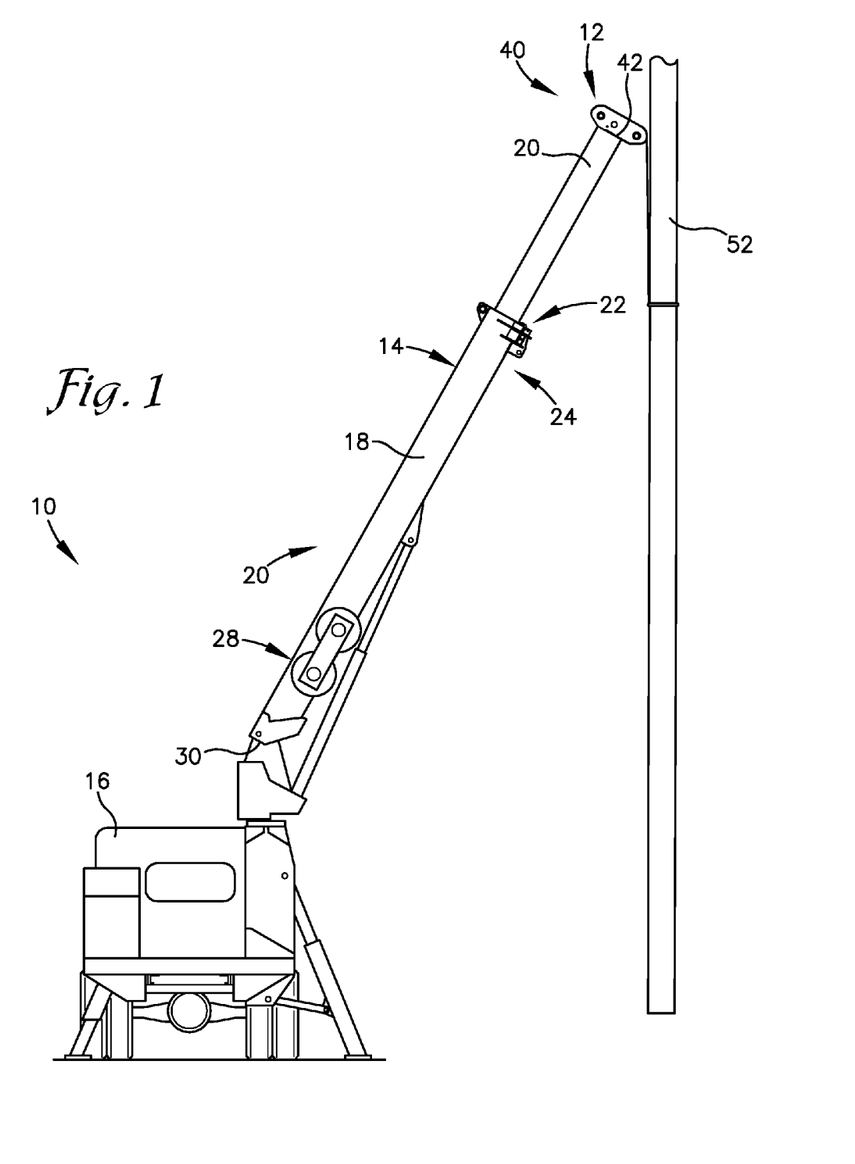
FIG. 1 is an environmental view of a utility truck with an attached boom assembly.

An aerial device 10, constructed in accordance with various embodiments of the invention, is shown in FIG. 1. The aerial device 10 utilizes a tool 12 to perform tasks that could include, but are not limited to: raising and lowering one or more people located inside of a utility platform; lifting a pallet of wood with a crane; drilling a hole for the emplacement of a pole or post; or excavating material such as dirt or sand by way of an earth-interfacing implement (not illustrated). The aerial device 10 generally includes a telescoping boom assembly 14 mounted on a base 16. The base 16 may be a large earth-working vehicle with wheels or tracks, a utility truck, or the like, as further discussed below. In the embodiment illustrated in FIG. 1, the base 16 is a truck on which the aerial device 10 is mounted. In another embodiment, the tool 12 supported by the aerial device 10 comprises a video camera, a microphone, or a photography camera. In this embodiment, the aerial device 10 comprises a base 16 that is selectively movable or stationary. The boom telescopes to achieve angles for the camera or microphone that a cameraperson could not achieve individually.

The telescoping boom assembly 14 broadly comprises a first boom section 18, a second boom section 20, and a track roller assembly 22. The track roller assembly 22 spreads the load placed upon the second boom section 20 across a greater surface area to prevent damage to the second boom section 20. In embodiments of the invention, the boom assembly 14 may comprise additional equipment including any of the following: power lines for the routing of hydraulic, pneumatic, or electrical power; communication wires for user-controls located on the boom assembly 14; or support cables (not illustrated).

The base 16 of the aerial device 10 is a selectively stabilized platform. In embodiments of the invention, the base 16 is a utility truck, a crane, an oil rig, or other fixed structure. The base 16 provides stability and a counterweight to the load and the various boom sections. Larger loads typically require a more stable and a heavier base 16. To achieve this stability, in embodiments of the invention, the base 16 may utilize hydraulic stabilizers, outriggers, and/or sand bags.

As used herein, the "first boom section" refers to an exterior boom section of the boom assembly 14 that has a larger diameter or vertical cross-sectional area about the width than the second boom section 20. As used herein, the "second boom section 20" refers to an inner boom section that has a smaller diameter or vertical cross-sectional area about the width than the first boom section 18. The second boom section 20 is at least partially disposed within the first boom section 18. The second boom section 20 telescopes to extend or retract into the first boom section 18. In embodiments of the invention, a second boom section 20 can serve as the first boom section 18 for a third boom section that is yet a further inner section that has a smaller diameter or vertical cross-sectional area about the width than the second boom section 20. The third boom section is at least partially disposed within the second boom section 20, which is itself at least partially disposed within the first boom section 18. In still further embodiments, the boom assembly further comprises a fourth boom section, a fifth boom section, etc.

Figure 2:
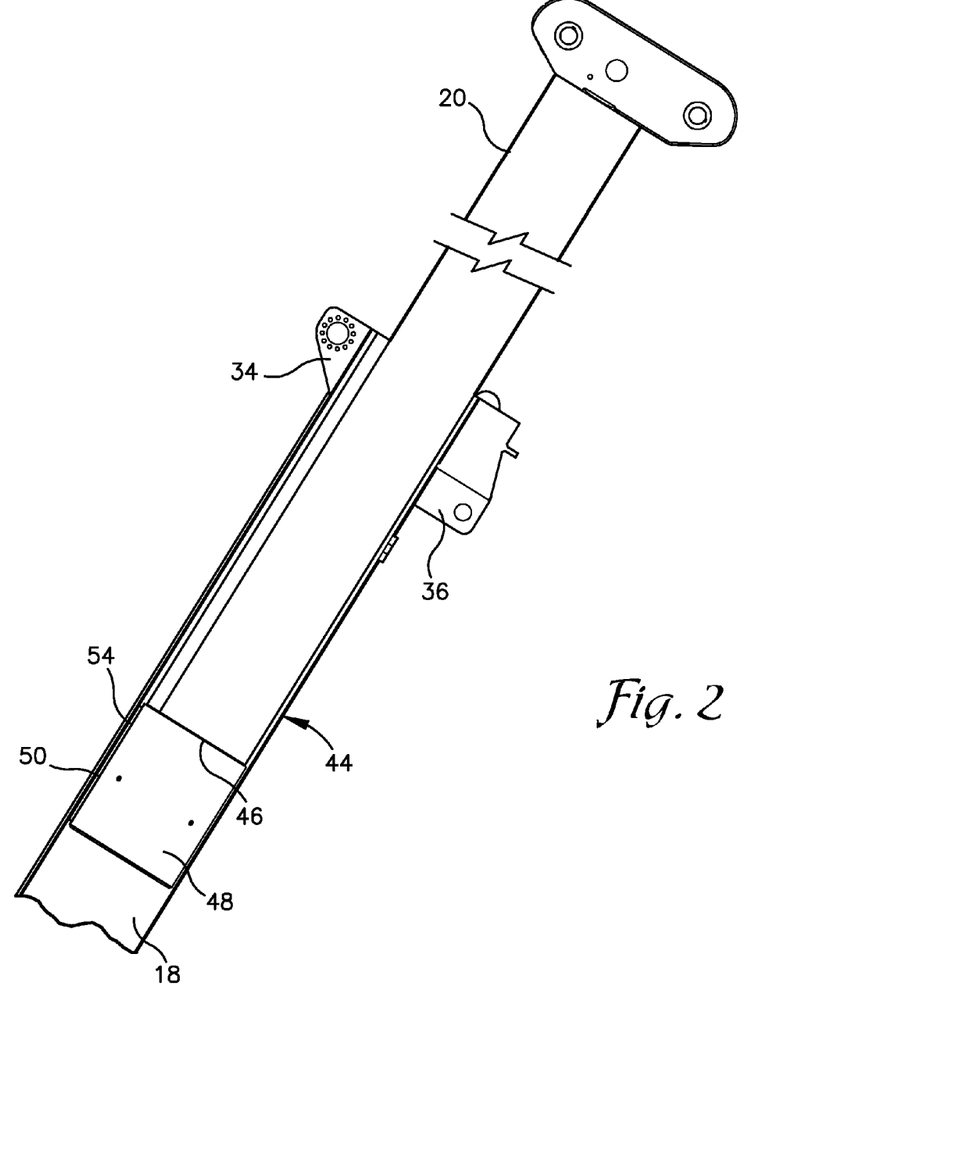
FIG. 2 is a fragmentary cross-sectional view along a length of the boom assembly.

As shown in FIGS. 1 and 2, in one embodiment of the invention the first boom section 18 is rectangular about its vertical cross-section, i.e., the cross-section through a width of the boom section 18, and the second boom section 20 is round about its vertical cross-section. In other embodiments, other shapes can be used, such as ovals, squares, pentagons, hexagons, octagons, or other regular and irregular shapes. In some embodiments, the first boom section 18 and the second boom section 20 will have a substantially similar cross-sectional shape. In other embodiments, the cross-sectional shapes are different.

As shown in FIGS. 1 and 2, the first boom section 18 comprises an elongated body that is at least partially hollow. The first boom section 18 presents a distal end 24 having a leading edge 26, a proximal end 28 having a trailing edge 30, a length, and an interior channel 32 extending through the hollowed body. In embodiments of the invention, the first boom section 18 is formed of fiberglass or a polymer. In other embodiments, the first boom section 18 is formed of metal. The proximal end 28 of the first boom section 18 is rotationally coupled to the base 16. In some embodiments, the proximal end 28 of the first boom section 18 is rotationally coupled to the base 16 such that the boom assembly 14 can rotate along more than one axis. In embodiments of the invention, the first boom section 18 presents a mount for the second boom section, which is schematically illustrated in FIG. 1. In embodiments of the invention, the first boom section 18 may further comprise a covering (not illustrated) over its trailing edge 30. The covering may be partially open to receive any of the power lines, communication wires, or cable.

The interior channel 32 of the first boom section 18 is of a sufficient vertical cross-sectional area about the width such that the interior channel 32 may house the second boom section 20 and the track roller assembly 22, as will be discussed below. In embodiments of the invention, the interior channel 32 may further house power cables, including hydraulic cables, communications lines, etc. In other embodiments, these cables and lines are coupled to the exterior of the first boom section 18.

Figure 3:
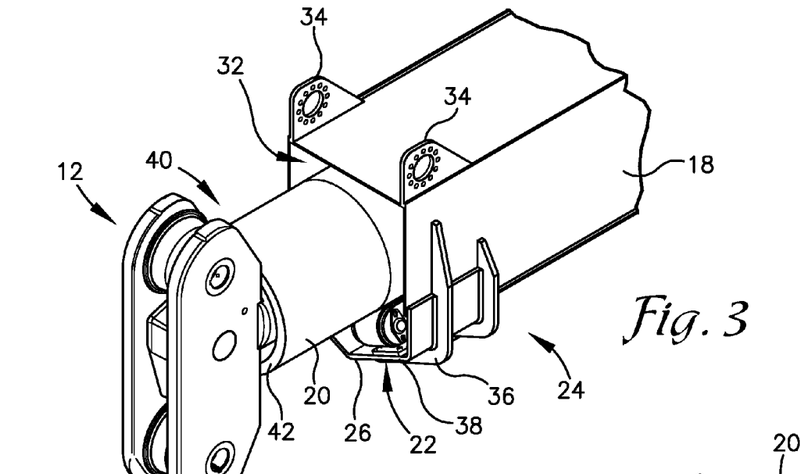
FIG. 3 is a perspective view of the boom assembly in FIG. 1.
Figure 4:
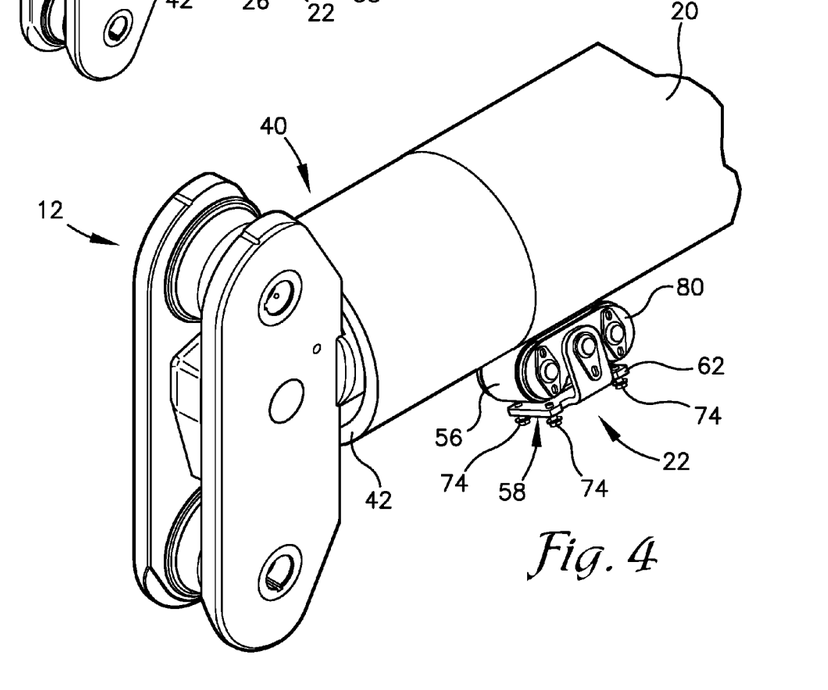
FIG. 4 is a perspective view of the boom assembly as illustrated in FIG. 3, but with an outer boom removed to more clearly show a first embodiment of a track roller assembly.

Referring to FIG. 3, the first boom section 18 may further include any or all of the following at the distal end 24 of the section 18: one or more exterior mounts 34 for an attached tool 12, a support flange 36, and a mount 38 for the track roller assembly 22. In embodiments of the invention, the first boom section 18 has a different vertical cross-sectional size and/or shape for a portion of its length near the distal end 24. In other embodiments, the first boom section 18 has a substantially constant vertical cross-sectional size and shape all along the length. As best shown in FIG. 3, in embodiments of the invention, the support flange 36 may be splayed around multiple sides of the distal end 24 of the first boom section 18. The support flange 36 provides additional bracing material around the distal end 24. The mount 38 for the track roller assembly 22 is located in the interior channel 32 of the first boom section 18. The mount 38 is generally flat to accept the track roller assembly 22. In embodiments, there is a plurality of mounts 38 to accept a plurality of track roller assemblies 22.

As shown in FIGS. 2-3, the second boom section 20 of the boom assembly 14 comprises an elongated body. The second boom section 20 presents a distal end 40 having a leading edge 42, a proximal end 44 having a trailing edge 46, and a length. In embodiments the second boom section 20 is solid (i.e., the second boom section 20 is not hollow). In other embodiments, the second boom section 20 is hollow. In some embodiments, the hollow second boom section 20 is adapted to receive a third boom section (not illustrated).

The second boom section 20 may telescope into a plurality of positions with respect to the first boom section 18, including a fully retracted position, in which the length of the body of the second boom section 20 is substantially inserted within the first boom section 18 (see, FIG. 3), and a fully extended position, in which only a relatively small portion of the length of the body of the second boom section 20 is inserted within the first boom section 18. In embodiments of the invention, a plurality of intermediate positions is also possible. In embodiments of the invention, the length of the second boom section 20 is substantially the same length of the first boom section 18. In other embodiments, the second boom section 20 may be shorter or longer than the first boom section 18.

The second boom section 20 is formed of fiberglass, a composite, or other polymer. Fiberglass has electrically insulative properties that electrically isolate the operator or tool and prevent a discharge of electricity from the power line through the fiberglass. In still other embodiments, the second boom section 20 is formed of a polymer. In yet further embodiments, the second boom section 20 is formed of metal.

In embodiments of the invention, the distal end 40 of the second boom section 20 is coupled to the tool 12, utility platform, or other device for performing work. As noted above, multiple types of tools 12 could be used with the boom assembly 14. For example, the tool may be a pulley for guiding a cable and a hook, an earth-working implement, such as a digger derrick, or a platform upon which a utility worker can stand.

Referring now to FIG. 2, in embodiments of the invention the second boom section 20 further comprises a base segment 48 coupled to the trailing edge 46 of the proximal end 44. The base segment 48 presents a top edge 50. When a load 52 is placed on the distal end 40 of the second boom section 20, the downward force of the load 52 translates to an upward force on the proximal end 44 of the second boom section 20. Therefore, at least when the load 52 is relatively heavy and placed on the distal end 40 of the second boom section 20, the top edge 50 of the base segment 48 is in contact with the interior channel 32 of the first boom section 18. It should be appreciated that the same would be true if the heavy load 52 was placed on a third boom section or a fourth boom section, etc., as these forces could damage the second boom section 20.

As illustrated in FIG. 2, the second boom section 20 further comprises a wear pad 54. In one embodiment, the wear pad 54 is coupled to the top edge 50 of the base segment 48. In another embodiment, the wear pad 54 is coupled to the interior channel 32 of the first boom section 18. In still further embodiments, multiple wear pads 54 are utilized. The wear pad 54 has a relatively low coefficient of friction so as to facilitate the translation of the second boom section 20 within the first boom section 18. In some embodiments, the wear pad 54 is removably coupled to the second boom section 20, such that it can be easily replaced upon being damaged or worn.

The second boom section 20 telescopes to extend out of the first boom section 18 and retract into the first boom section 18. A hydraulic cylinder (not illustrated) applies hydraulic power to the second boom section 20. The hydraulic cylinder is coupled to the base segment 48 of the second boom section 20 and to the first boom section 18. In one embodiment of the invention, the hydraulic cylinder acts as a double acting cylinder. In other embodiments, the boom assembly 14 acts as a single acting cylinder. In still further embodiments, the second boom section 20 telescopes via electrical power.

Turning now to FIGS. 5-8, the track roller assembly 22 of the telescoping boom assembly 14 will be described. The track roller assembly 22 facilitates the telescoping of the second boom section 20 in and out of the first boom section 18. The track roller assembly 22 is adapted to rotate a continuous track 56 with minimal friction. The track roller assembly 22 comprises a mounting assembly 58, a plurality of rollers 60, and the continuous track 56. The mounting assembly 58 rotatably couples each of the plurality of rollers 60 to the interior channel 32 of the first boom section 18. Each of the plurality of rollers 60 is adapted to rotate about a respective center axis. The continuous track 56 is wrapped around each of the plurality of rollers 60, such that at least two of the plurality of rollers 60 are in contact with the continuous track 56.

Figure 5:
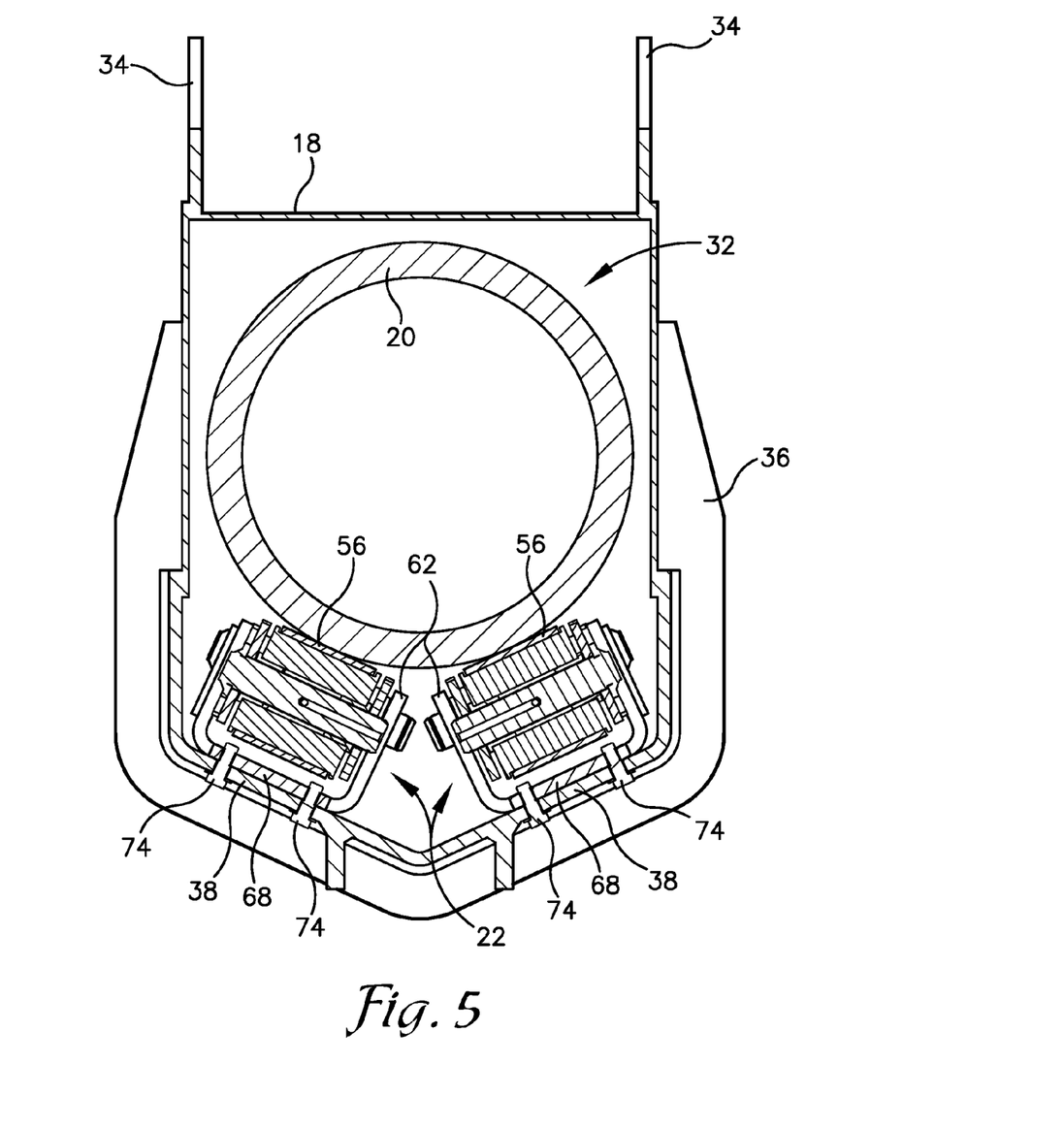
FIG. 5 is a cross-sectional view through a width of the boom assembly illustrating the position of two track roller assemblies in the boom assembly.
Figure 6:
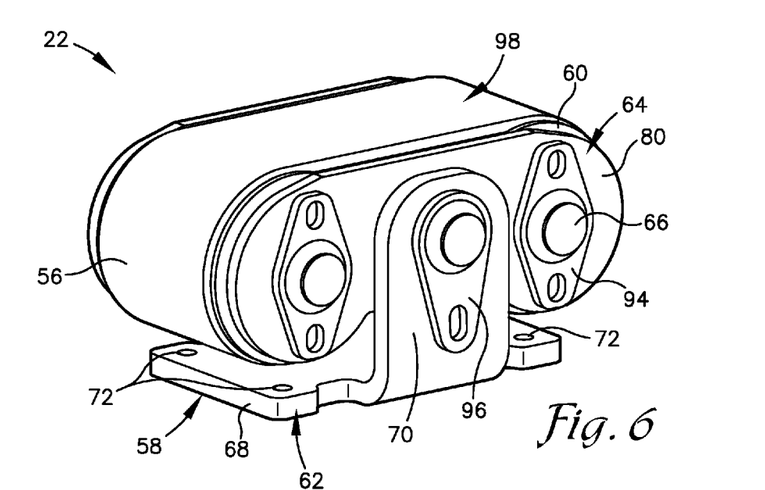
FIG. 6 is a perspective view of the first embodiment of the track roller assembly.
Figure 7:
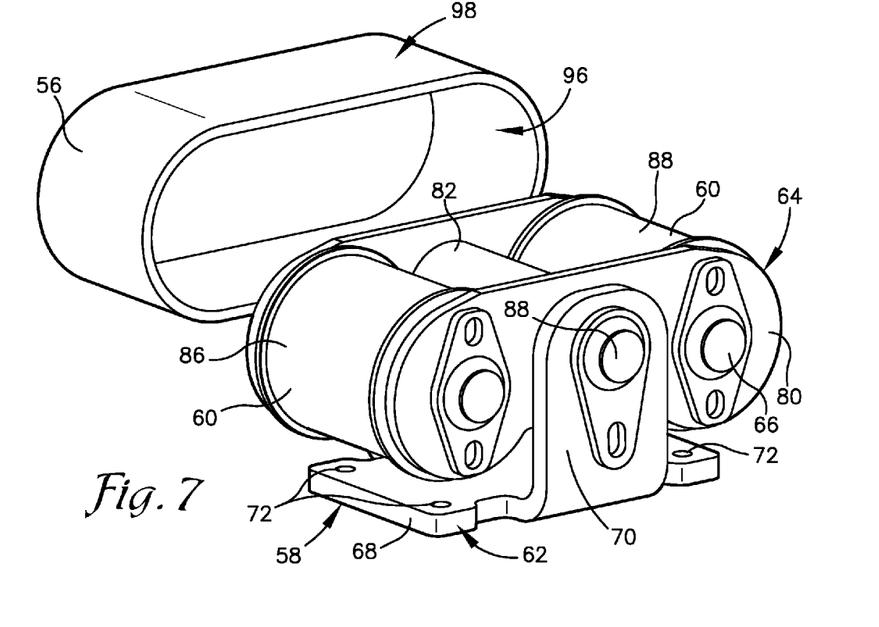
FIG. 7 is a perspective view of the first embodiment of the track roller assembly, illustrating a removed continuous track to expose the plurality of rollers.
Figure 9:
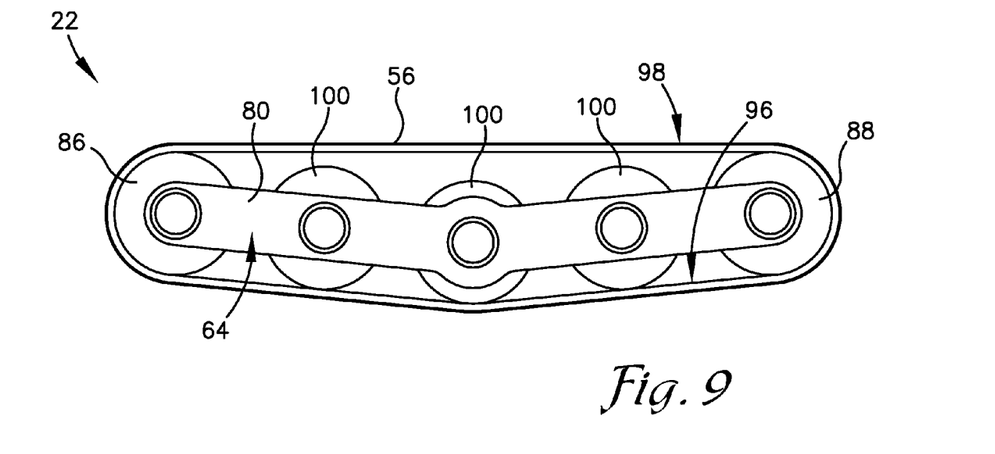
FIG. 9 is a side view of a second embodiment of the track roller assembly that comprises five rollers and illustrated in a first interfacing position.
Figure 10:
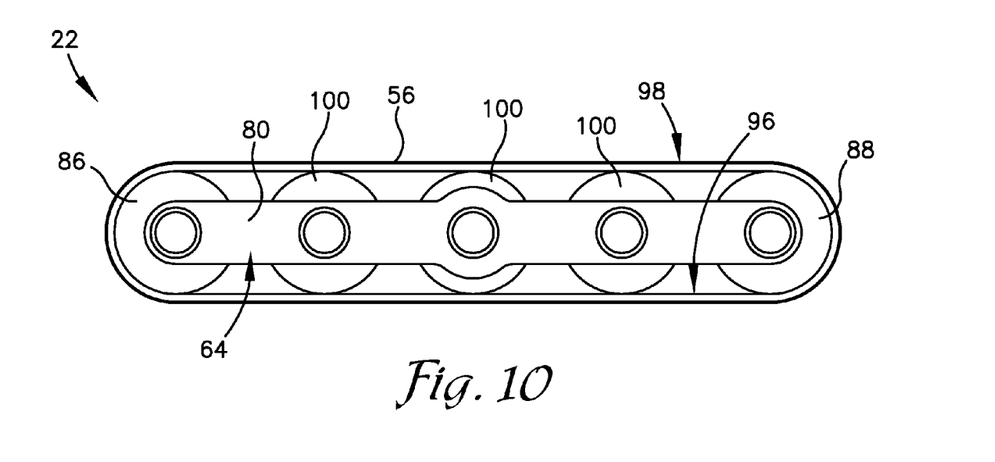
FIG. 10 is a side view of the second embodiment of the track roller assembly of FIG. 9 illustrated in a second interfacing position.

As illustrated in FIG. 5, the telescoping boom assembly 14 comprises a plurality of track roller assemblies 22. The track roller assembly 22 is securely coupled to the mount 38 on the first boom section 18. In embodiments as discussed below, the track roller assembly 22 is deformable into at least a first interfacing shape, as shown in FIG. 9, and a second interfacing shape, as shown in FIG. 10.

The mounting assembly 58 is illustrated in FIGS. 5-8 and comprises a generally U-shaped bracket 62, a roller housing 64 having at least one opening 65 in which the plurality of rollers 60 is attached, and securing pins 66 for securing the plurality of rollers 60 in the roller housing 64. The mounting assembly 58 is formed of metal or other rigid structure that can withstand the weight of the first and second boom sections 18,20, the load 52, and the stresses accompanying the telescoping of the boom sections 18,20.

Figure 8:
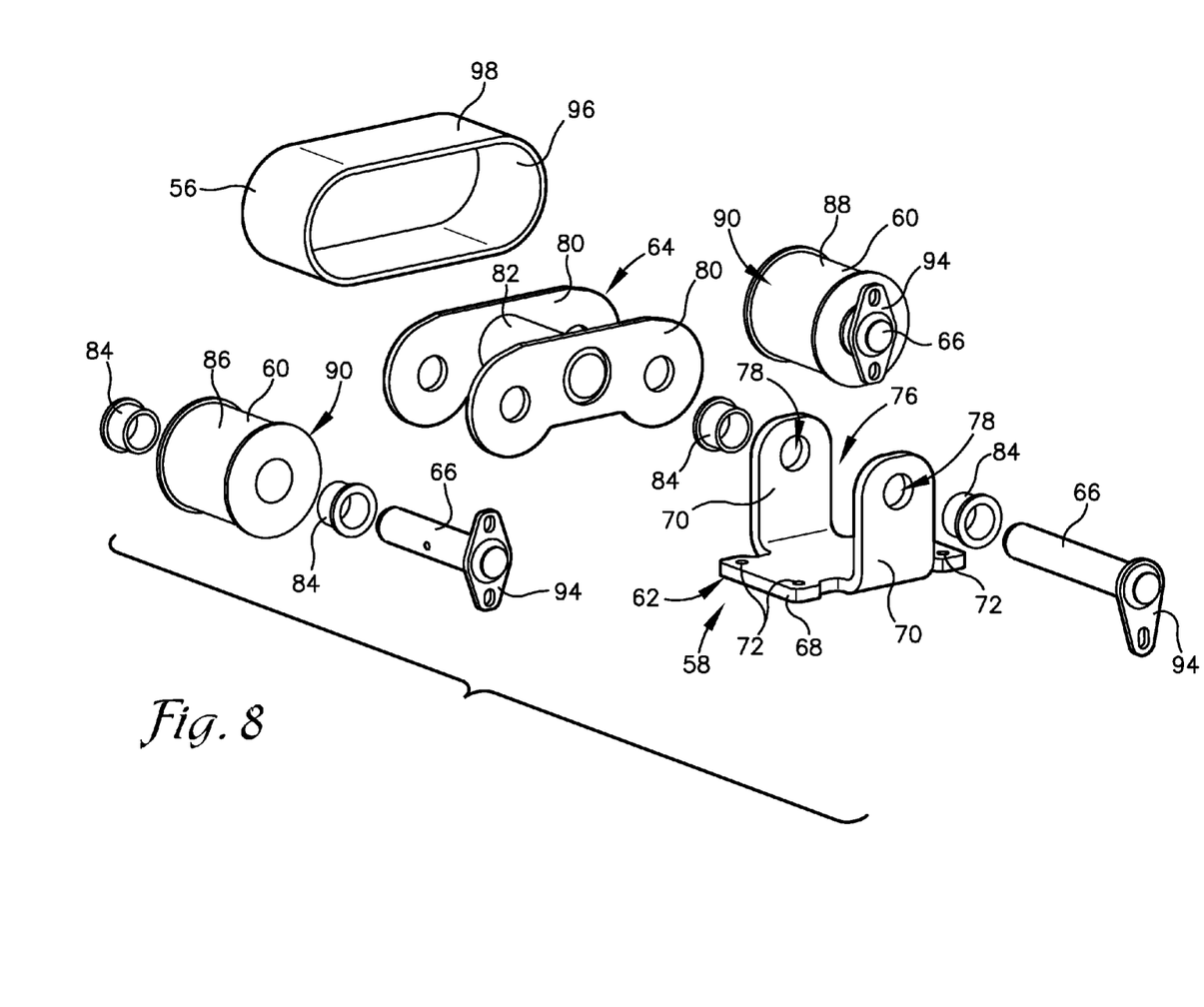
FIG. 8 is an exploded view of the first embodiment of the track roller assembly and its component parts.

As best illustrated in FIG. 8, the bracket 62 includes a mounting plate 68 and opposing arms 70 extending upwardly from the mounting plate 68, such that the mounting plate 68 and opposing arms 70 form the general U-shaped bracket 62. The mounting plate 68 is generally flat and includes a plurality of openings 72 to receive fasteners 74, such as screws or bolts. In embodiments of the invention, the mounting plate 68 is secured to the interior channel 32 of the first boom section 18, as illustrated in FIGS. 3 and 5. The mounting plate 68 is sized and shaped to fit flush against the mount 38 of the first boom section 18. In embodiments of the invention, the plate 68 may be another shape to complement a shape of the mount 38 of the first boom section 18. For example, if the mount 38 of the first boom section 18 is curved, the mounting plate 68 may also be curved so that substantially all of a bottom surface of the plate 68 may be in contact with the mount 38 of the first boom section 18.

The mounting plate 68, and thus the bracket 62, is secured to the mount 38 of the first boom section 18 by inserting screws or fasteners 74 through the plurality of openings 72 in the mounting plate 68 and into the first boom section 18.

Other securement methods may also be employed, such as adhering the mounting plate 68 to the first boom section 18 via a high-strength adhesive, welding the mounting plate 68 to the first boom section 18, or integrally forming the mounting plate 68 (and/or the bracket 62) with the first boom section 18.

As noted above, the arms 70 extend upwardly from the plate 68 and are spaced from each other to form a receiving area 76 for the roller housing 64. The arms 70 are integrally formed with the mounting plate 68, such that the bracket 62 comprising the mounting plate 68 and arms 70 is a monolithic unit. Each arm 70 includes an opening 78 therethrough for receiving the securing pins 66, as further described below.

The roller housing 64 is sized and configured to rest within the receiving area 76 formed by the mounting plate 68 and upwardly extending arms 70. The roller housing 64 is generally H-shaped (when viewed from above) and comprises two spaced side plates 80 and a support bar 82 extending therebetween. Each side plate 80 has a generally oblong shape that allows the continuous track 56 to roll around an exterior edge of the side plate 80 during use of the track roller assembly 22.

One advantage of the roller housing 64 is being able to quickly and easily replace the track roller assembly 22 should one or more of the rollers 60 or the track become damaged. Another advantage is the ability of the roller housing 64 to pivot about the securing pin 66. The pivoting action allows each of the rollers 60 to stay in contact with the second boom section 20 even if the second boom section 20 is not substantially parallel to the first boom section 18 due to a heavy load 52 being placed on the second boom section 20 or the third boom section.

The roller housing 64 is pivotably coupled to the arms 70 via the securing pin 66, such that the roller assembly 68 can be pivoted up and down in the longitudinal direction of the first boom section 18. The securing pin 66 is emplaced through the opposing arms 70 and the support bar 82 when the roller housing 64 is in the receiving area 76 of the bracket 62. Pivoting allows the track roller assembly 22 to accommodate the second boom section 20 based upon the extended position of the second boom section 20 relative to the first boom section 18 and the weight of the load 52 placed upon the second boom section 20. The securing pin 66 may also utilize at least one securing washer 84 to facilitate the pivoting. The securing washer 84 facilitates the pivoting of the roller housing 64 around the securing pin 66 and prevents damage to each. The securing pin 66 and the at least one securing washer 84 are formed of a metal. In other embodiments, the securing pin 66 and the at least one securing washer 84 are formed of a hardened polymer. In another embodiment, the roller housing 64 is fixedly secured to the arms 70. In yet another embodiment, the roller housing 64 and the arms 70 are monolithic.

The track roller assembly 22 comprises a plurality of rollers 60, including at least a first roller 86 and a second roller 88. Each of the plurality of rollers 60 is wheel or cylindrically shaped and presents an outer rim 90. The outer rim 90 of the rollers 60 presents a vertical cross-sectional shape across the outer rim 90. As shown in FIG. 8, the cross-sectional shape can be substantially flat. In other embodiments, the cross-sectional shape may be convex, concave, arcuate, semi-circular, V-shaped, or A-shaped. The rollers 60 are adapted to freely rotate about an axis that is substantially perpendicular to the longitudinal direction of the first boom section 18. As such, the outer rim 90 of the rollers 60 rotates in a direction substantially parallel to the longitudinal direction of the first boom section 18. The rollers 60 are substantially rigid so as to support the load 52 of the second boom section 20 as it telescopes into the plurality of positions with respect to the first boom section 18. Each roller 60 has a diameter such that a portion of the outer rim 90 of the roller 60 extends beyond the roller housing 64 when the roller 60 is rotatably coupled to the roller housing 64. This allows for the free rotation of the continuous track 56 about the rollers 60.

The arms 70 are adapted to rotatably couple the plurality of rollers 60. In embodiments, a plurality of securing pins 66 is utilized to rotatably couple each of the plurality of rollers 60 to the arms 70. Each of the plurality of securing pins 66 is disposed in the opening 78 in the arms 70 and through a respective opening 92 in each of the rollers 60. The securing pin 66 is substantially cylindrical such that the roller 60 may rotate about the securing pin's 66 vertical cross-section about the width. The securing pin 66 may further comprise a head 94. The head 94 of the securing pin 66 is adapted to secure the securing pin 66 to the roller housing 64, the arms 70 of the bracket 62, or the interior channel of the first boom section 18. One roller 60 is placed into the receiving area 76 between the two arms 70 of the roller housing 64, and one securing pin 66 passes through the opening 92 in the roller 60 and the pair of arms 70 in the roller housing 64. In embodiments of the invention, the securing pin 66 further comprises a plurality of bearings to facilitate free rotation of the roller.

In other embodiments, the track roller assembly 22 further comprises at least one securing washer 84, which presents an interior diameter approximately equal to, or slightly larger than, an outer diameter of the securing pin 66. This allows the securing washer 84 to be disposed around the securing pin 66 when it is attached to the roller assembly 68.

The continuous track 56 of the roller assembly 68 of the track roller assembly 22 is a belt presenting an interior surface 96 and an exterior surface 98. In embodiments of the invention, the continuous track 56 is formed of one or more layers of pliable material, such as a polymer or composite. The pliable material provides linear strength and retains the shape of the continuous track 56. The pliable material has a high compliance, which is the inverse of stiffness, such that it will easily deform under the forces. The compliance is advantageous in facilitating the rotation of the continuous track 56 and in providing greater contact surface area with the second boom section 20. The pliable material of the continuous track 56 also has a lower elastic modulus than the second boom section 20. The pliable material will therefore deform to a greater extent than the material of the second boom section 20. Because the second boom section 20 rests on the exterior surface 98 of the continuous track 56, the continuous track 56 prevents and/or reduces damage to the second boom section 20 caused by the force of the load 52.

In other embodiments, the continuous track 56 comprises a plurality of pivotably linked segments (not illustrated). Each of the plurality of segments is rigid or semi-rigid.

The interior surface 96 of the continuous track 56 is disposed around the first roller 86 and second roller 88. In embodiments of the invention, the interior surface 96 of the continuous track 56 is substantially smooth. In other embodiments, the interior surface 96 of the continuous track 56 further comprises a plurality of protrusions (not illustrated) that are disposed in a corresponding plurality of recesses (not illustrated) in the first roller 86 and the second roller 88. In embodiments, the first roller 86 and the second roller 88 may have a plurality of teeth or cogs (not illustrated), so as to present a sprocket shape.

The exterior surface 98 of the continuous track 56 is substantially smooth. In other embodiments, the exterior surface 98 of the continuous track 56 further comprises a plurality of protrusions (not illustrated) or recesses (not illustrated), also called tread. The recesses and protrusions may provide advantages including facilitating the rotation of the continuous track 56 around the roller 60; ensuring that a rotation of the continuous track 56 corresponds to a similar rotation of the first roller 86 and the second roller 88, so as to minimize damage to the continuous track 56; ensuring that the continuous track 56 rotates in a direction substantially parallel to the rotation direction of the first roller 86 and the second roller 88, so as to minimize the likelihood that the continuous track 56 will slip or dislodge off the rollers 60; and providing increased frictional contact between the continuous track 56, so as to provide a stable support for the second boom section 20.

A track roller assembly 22 in accordance with another embodiment of the invention further comprises at least one roller 60 that is a secondary roller 100. The at least one secondary roller 100 is rotatably coupled to the roller housing 64 between the first roller 86 and the second roller 88. The at least one secondary roller 100 provides the advantage of distributing the weight of the second boom section 20 and the load 52 more evenly.

In embodiments, the roller housing 64 is deformable or deflectable into a first interfacing shape, as illustrated in FIG. 9, and a second interfacing shape, as illustrated in FIG. 10. In the first interfacing shape, only the first roller 86 and the second roller 88 are in contact with the interior surface 96 of the continuous track 56 that is adjacent to the second boom section 20. In the second interfacing shape, the first roller 86, second roller 88, and each of the at least one secondary roller 100 is in contact with the interior surface 96 of the continuous track 56 that is adjacent to the second boom section 20.

In one embodiment of the invention, the roller housing 64 is formed of a material, such as a polymer or a metal, that deforms or deflects upon the application of a heavy load 52. In another embodiment of the invention, the roller housing 64 further comprises a compression element (not illustrated), such as a spring, which provides a force pushing the roller housing 64 into the first interfacing position. Upon the application of a heavy load 52, the compression element compresses until the at least one secondary roller 82 interfaces with the interior surface 96 of the continuous track 56. In one embodiment, as illustrated in FIGS. 9-10, the roller housing 64 has a substantially V-shape when in the first interfacing position and has a substantially straight shape when in the second interfacing position. In another embodiment of the invention, the roller housing 64 has an arcuate shape in the first interfacing position and a substantially straight shape in the second interfacing position.

The installation and emplacement of the track roller assembly 22 will now be described in greater detail. The following is an exemplar of the installation and emplacement of the track roller assembly 22. In embodiments of the invention, the roller assembly 68 is formed by the following steps: emplacing the first roller 86 into the roller housing 64 and aligning the at least one opening 65 in the roller housing 64 with the opening 92 in the first roller 86; emplacing the securing pin 66 through the securing washer 84, the at least one opening 78 in the arm 70, the opening 92 in the first roller 86, and through another securing washer 84; locking the securing pin 66 to the first roller 86 to prevent its unintentional displacement; repeating steps 1-3 for the second roller 88; and emplacing the continuous track 56 around the first roller 86 and the second roller 88.

The track roller assembly 22 is then formed by emplacing the roller assembly 68 into the receiving area 76 between the arms 70 of the bracket 62 and aligning the at least one opening 78 in the arm 70 with a corresponding opening 65 through the support bar 82 in the roller housing 64; emplacing the securing pin 66 through the securing washer 84, the at least one opening 78 in the arm 70 of the bracket 62, the opening 65 in the roller housing 64, and through another securing washer 84; and locking the securing pin 66 to prevent its unintentional displacement. The track roller assembly 22 is then installed by emplacing the track roller assembly 22 into the first boom section 18 and aligning the plurality of openings 72 in the mounting plate 68 with a corresponding plurality of openings (not illustrated) in the mount 38 of the first boom section 18; securing the track roller assembly 22 to the first boom section 18 by applying the plurality of fasteners 74 to the aligned openings 72 in the mounting plate 68 and the openings in the mount 38 of the first boom section 18; and emplacing and telescopically securing the second boom section 20 into the first boom section 18, such that the exterior surface 98 of the continuous track 56 is adjacent an exterior portion of the second boom section 20.

In embodiments of the invention, multiple track roller assemblies 22 are installed into the first boom section 18. In one embodiment, as illustrated in FIG. 5, two track roller assemblies 22 are emplaced adjacent to each other such that they provide lateral support in addition to their longitudinal support. In this embodiment, the first boom section 18 comprises two mounts 38 that form an obtuse angle near the distal end 24 of the first boom section. This embodiment of the invention is advantageous because it provides lateral support as well as vertical support to the second boom section 20.

In another embodiment, two adjacent track roller assemblies 22 are emplaced such that in the event of a failure of one, the other track roller assembly 22 provides the support for the second boom section 20 and the load 52. In another embodiment of the invention, a plurality of track roller assemblies 22 is spaced along the longitudinal direction to further distribute the weight of the second boom section 20.

Operation and use of the track roller assembly 22 will now be described in greater detail. The track roller assembly 22 is a passive element in the telescoping boom assembly 14. The track roller assembly 22 receives no direct power input of its own. The continuous track 56 and the rollers 60 rotate as a by-product of the friction between the second boom section 20 and the exterior surface 98 of the continuous track 56 as the second boom section 20 extends and retracts relative to the first boom section 18. In other embodiments of the invention, the track roller assembly 22 is powered, such that the rotation of the rollers 60 provides at least some of the force that extends or retracts the second boom section 20 relative to the first boom section 18.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A telescoping boom assembly for an aerial device, the boom assembly comprising:

an elongated, hollowed first boom section presenting a distal end, a proximal end, and an interior channel having a length;

an elongated second boom section configured to telescope within at least a portion of the length of the interior channel of the first boom section; and a track roller assembly for facilitating telescoping of the second boom section relative to the first boom section and supporting at least a portion of the weight of the second boom section, said track roller assembly positioned in the interior channel at the distal end of the first boom section, said track roller assembly comprising —
- a bracket securely coupled to said interior channel of the first boom section,
- a plurality of rollers rotatably coupled to the bracket,
- a continuous track disposed around the plurality of rollers and presenting an interior surface and an exterior surface,
- wherein the interior surface of the continuous track is disposed around and engages the plurality of rollers,
- wherein the exterior surface of the continuous track is adjacent to and directly supporting the second boom section.

2. The telescoping boom assembly of claim 1, wherein the second boom section is formed of fiberglass.

3. The telescoping boom assembly of claim 1, wherein the first boom section is formed of fiberglass.

4. The telescoping boom assembly of claim 1, further comprising a hydraulic power source that telescopes the second boom section within the first boom section.

5. The telescoping boom assembly of claim 1, wherein the first boom section is pivotably and rotatably coupled at its proximal end to the aerial device.

6. The telescoping boom assembly of claim 1, further comprising a utility platform disposed at the distal end of the second boom section.

7. The telescoping boom assembly of claim 1, further comprising a second track roller assembly,
- wherein said track roller assembly and said second track roller assembly are each disposed within said interior channel of the first boom section and laterally adjacent to each other.

8. The telescoping boom assembly of claim 1, wherein said bracket further comprises a mounting plate and at least two opposing arms.

9. The telescoping boom assembly of claim 8, wherein the bracket is fastened to said interior channel of the first boom section via a plurality of fasteners.

10. The telescoping boom assembly of claim 1, wherein the track roller assembly further comprises:
- a roller assembly, comprising —
  - a roller housing pivotably secured to the at least two opposing arms of the bracket,
  - a first roller of said plurality of rollers, rotatably coupled to the roller housing,
  - a second roller of said plurality of rollers, rotatably coupled to the roller housing.

11. The telescoping boom assembly of claim 10,
wherein the roller assembly further comprises:
- a first securing pin emplaced in an opening in the roller housing and a corresponding opening in the first roller,
- a second securing pin emplaced in an opening in the roller housing and a corresponding opening in the second roller, wherein the track roller assembly further comprises:
- a third securing pin emplaced in an opening in the at least two opposing arms and a corresponding opening in said roller housing.

* * * * *